(12) United States Patent
Donderici

(10) Patent No.: US 12,259,737 B2
(45) Date of Patent: Mar. 25, 2025

(54) AUTONOMOUS VEHICLE CABIN AND CONTROLLER TO MANAGE A FLEET OF ROBOTS

(71) Applicant: GM Cruise Holdings LLC, San Francisco, CA (US)

(72) Inventor: Burkay Donderici, Burlingame, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 214 days.

(21) Appl. No.: 17/977,800

(22) Filed: Oct. 31, 2022

(65) Prior Publication Data

US 2024/0142998 A1 May 2, 2024

(51) Int. Cl.
| | |
|---|---|
| *B65G 67/04* | (2006.01) |
| *G05D 1/646* | (2024.01) |
| *G05D 1/69* | (2024.01) |
| *G05D 105/20* | (2024.01) |
| *G05D 109/10* | (2024.01) |
| *G05D 111/50* | (2024.01) |

(52) U.S. Cl.
CPC ............... *G05D 1/69* (2024.01); *B65G 67/04* (2013.01); *G05D 1/646* (2024.01); *G05D 2105/20* (2024.01); *G05D 2109/10* (2024.01); *G05D 2111/50* (2024.01)

(58) Field of Classification Search
CPC ...... G05D 1/69; G05D 1/646; G05D 2105/20; G05D 2109/10; G05D 2111/50; G05D 1/6985; G05D 1/697; G05D 2105/10; G05D 2105/22; G05D 2107/13; G05D 2107/95; B65G 67/04; B60W 60/00
See application file for complete search history.

(56) References Cited

U.S. PATENT DOCUMENTS

| | | | |
|---|---|---|---|
| 2019/0377349 A1* | 12/2019 | van der Merwe | ... G05D 1/0231 |
| 2020/0051001 A1* | 2/2020 | Donnelly | ............... G06Q 50/40 |
| 2021/0302582 A1* | 9/2021 | Liu | ......... G01S 17/93 |
| 2022/0017332 A1* | 1/2022 | Kim | ......... B66B 13/14 |
| 2022/0219903 A1* | 7/2022 | Kalouche | ............... B60P 3/007 |
| 2022/0253059 A1* | 8/2022 | Pandey | ............... G05D 1/0274 |
| 2022/0258632 A1* | 8/2022 | Ehrenhalt | ............... B60L 53/67 |

* cited by examiner

*Primary Examiner* — Abby Y Lin
*Assistant Examiner* — Dylan M Katz

(57) ABSTRACT

Systems and techniques are provided for management of autonomous cargo by autonomous vehicles (AVs). An example method can include determining, based on data from one or more sensors, a location for deploying a ramp that enables robots to enter the AV, the location comprising an area free of obstacles having one or more dimensions above a threshold; generating an instruction configured to trigger the AV to stop at the location; based on a determination that the AV is at the stopping position, deploying the ramp; sending, to the robots, a message instructing the robots to enter a cabin of the AV via the ramp and guiding each robot to a respective location within the cabin; and based on a determination that the AV has reached a destination of one or more robots, deploying the ramp and guiding the one or more robots to exit the cabin via the ramp.

19 Claims, 8 Drawing Sheets

620

PREPARE ONE OR MORE ROBOTS FOR A TARGET OPERATION/
TASK OF THE ONE OR MORE ROBOTS AT A DESTINATION
LOCATION
622

BASED ON A DETERMINATION THAT THE AUTONOMOUS VEHICLE
IS AT THE DESTINATION LOCATION, DEPLOY A RAMP
CONFIGURED TO ENABLE THE ONE OR MORE ROBOTS TO
ENTER THE AUTONOMOUS VEHICLE
624

SEND, BY THE AUTONOMOUS VEHICLE TO THE ONE OR MORE
ROBOTS AFTER THE ONE OR MORE ROBOTS COMPLETE THE
TARGET OPERATION/TASK, INSTRUCTIONS ON HOW TO RETURN
TO THE AUTONOMOUS VEHICLE AND/OR ENTER THE
AUTONOMOUS VEHICLE TO BE TRANSPORTED FROM THE
DESTINATION LOCATION TO ANOTHER DESTINATION LOCATION
626

FIG. 6B

AUTONOMOUS VEHICLE CABIN AND CONTROLLER TO MANAGE A FLEET OF ROBOTS

TECHNICAL FIELD

The present disclosure generally relates to the delivery and management of autonomous cargo by autonomous vehicles. For example, aspects of the present disclosure relate to techniques and systems for delivering and guiding one or more robots to a predetermined destination.

BACKGROUND

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at specific locations on the autonomous vehicles.

BRIEF DESCRIPTION OF THE DRAWINGS

Illustrative aspects and examples of the present application are described in detail below with reference to the following figures:

FIG. 6B is a flowchart illustrating another example process for delivery and management of autonomous robots by an autonomous vehicle, in accordance with some examples of the present disclosure.

DETAILED DESCRIPTION

Figure 1:
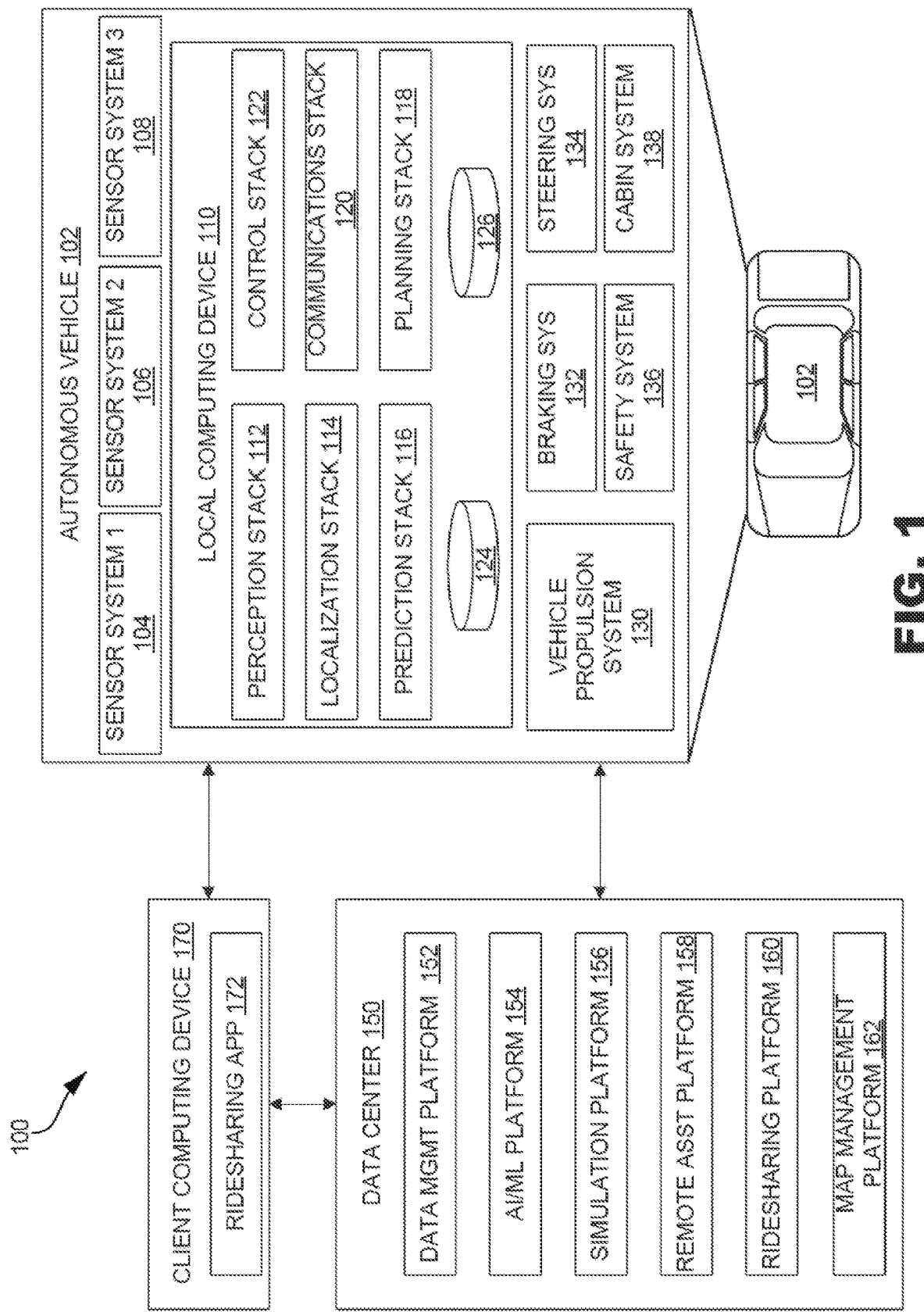
FIG. 1 is a diagram illustrating an example system environment that can be used to facilitate autonomous vehicle navigation and routing operations, in accordance with some examples of the present disclosure.

Certain aspects and examples of this disclosure are provided below. Some of these aspects and examples may be applied independently and some of them may be applied in combination as would be apparent to those of skill in the art. In the following description, for the purposes of explanation, specific details are set forth in order to provide a thorough understanding of aspects and examples of the application. However, it will be apparent that various aspects and examples of the disclosure may be practiced without these specific details. The figures and description are not intended to be restrictive.

The ensuing description provides examples and is not intended to limit the scope, applicability, or configuration of the disclosure. Rather, the ensuing description of aspects and examples of the disclosure will provide those skilled in the art with an enabling description for implementing an example implementation of the disclosure. It should be understood that various changes may be made in the function and arrangement of elements without departing from the scope of the application as set forth in the appended claims.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

As previously explained, autonomous vehicles (AVs) can include various sensors, such as a camera sensor, a light detection and ranging (LIDAR) sensor, a radio detection and ranging (RADAR) sensor, amongst others, which the AVs can use to collect data and measurements that the AVs can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system.

The use of robots to accomplish various tasks and applications has increasingly become commonplace in today's world. For example, robots are routinely employed to complete various household tasks such as cleaning and sweeping, among other well-known tasks. Robots can also be employed to deliver items such as food or packages, in addition to countless other uses. While AVs have been traditionally designed to transport human beings, an AV's cabin can be configured and optimized for transporting robots. The AV's controller can additionally control the transportation and operation of a fleet of robots, both inside and outside the AV.

Described herein are systems, apparatuses, processes (also referred to as methods), and computer-readable media (collectively referred to as "systems and techniques") for delivery and management of autonomous cargo (referred to as "robots") by AVs. The present disclosure generally relates to techniques and systems for delivering and guiding one or more robots to a predetermined destination. In some aspects, the AV controller uses one or more sensors to determine a location free of obstacles for deploying a ramp to enable a plurality of robots to enter the AV via the ramp. In some examples, the AV controller can determine whether a location is sufficiently free of obstacles to deploy a ramp if the location lacks obstacles having at least a threshold dimension (e.g., a threshold size, width, depth, inclination, angle, etc.) and/or if the AV controller determines that the ramp can be fully deployed (or deployed a threshold amount) without being prevented from being fully deployed (or deployed a threshold amount) by any obstacles. The AV controller communicates with the robots to instruct the robots to enter the cabin of the AV via the deployed ramp and position themselves at predetermined locations within the AV cabin. The AV controller can communicate, to the robots, timing information for entering or exiting the AV via the ramp, an order of robots entering or exiting the AV, location parameters to guide the robots to enter or exit the ramp, etc. The AV cabin includes mechanisms to physically restrain the robots within the cabin of the AV. Once the robots are securely located within the cabin of the AV, the AV controller instructs the AV to transport the robots to a predetermined destination for all the robots or various destinations for the robots. Once the AV has reached a predetermined destination where one or more of the robots need to be dropped off, the AV controller triggers a deployment of the ramp at a specific location to allow the one or more of the robots to exit the AV, and instructs the one or more of the robots to exit the AV via the deployed ramp.

The AV controller can identify the particular location where to deploy the ramp to allow robots to exit the AV as previously explained with respect to the deployment of the ramp to allow the robots to enter the AV. For example, the AV controller can obtain from the AV sensor data (e.g., image data from a camera sensor(s), data from a light detection and ranging (LIDAR) sensor, data from a radio detection and ranging (RADAR) sensor, data from an inertial measurement unit (IMU), data from a time-of-flight (TOF) sensor, and/or data from any other type of sensor) depicting and/or describing one or more characteristics of the location (e.g., a dimension of the location, a curvature or inclination angle of the location, characteristics (e.g., dimensions, configuration, etc.) of one or more obstacles in the location, etc.), and can use the sensor data to verify that there are no obstacles in the location that would prevent deployment of the ramp, prevent the ramp from being extended a certain amount, prevent an end of the ramp opposite to the AV from touching a surface for support, prevent the ramp from being deployed and maintaining a deployed position that is within a particular angle (e.g., within a particular pitch angle, roll angle, etc.). The AV controller controls the process for the robot fleet.

To illustrate, the AV controller instructs the AV to approach a robot (or multiple robots) at a particular location outside of the AV. The AV controller then instructs the AV to deploy a robot-accessible ramp when the AV arrives at the particular location, which can be a location proximate to the robot (or multiple robots). The AV sensing system can use one or more sensors to determine characteristics of a location to deploy the ramp such as, for example, a dimension of the location (e.g., width, depth, length, etc.), an angle or inclination of the location, whether there are any obstacles that may prevent the ramp from being deployed (fully or partially up to a threshold amount or extension) and/or from being deployed in at a certain angle or rested in a support surface having less than a threshold amount of curvature and/or inclination that would cause a certain amount of instability of the ramp, etc. For example, in some cases, the AV sensing system can use one or more LIDARs, camera sensors, inertial measurement units, and/or any other suitable sensor to intelligently deploy the ramp in order to avoid obstacles, ensure a certain amount of stability of the ramp when deployed, and ensure access to the robots.

In some cases, a "tower" controller detects the robots using the AV's perception system, and organizes the access order and timing of multiple robots using the AV's planning system. The interior of the AV (e.g., the cabin of the AV) can include areas designated for robots to come to a stop and be secured within the AV, rather than (or in addition to) traditional car seats. When a robot reaches a designated area within the AV cabin, a locking mechanism secures the robot in place. The locking mechanism can include a mechanical locking mechanism, a magnetic locking mechanism, and/or any other type of locking or securing mechanism. Once the robot(s) are secured within the AV cabin, the AV controller instructs the AV to retract the ramp and proceed to a destination of one or more of the robots. The AV controller can instruct the AV to stop at a location within the destination where the AV can deploy a ramp for the robot(s) to exit the AV, as previously explained. Once at the destination, the AV controller instructs the AV to release the locking mechanisms and redeploy the ramp to allow the robots to exit the cabin of the AV.

In some examples, the locking mechanism can include an electric power charging means and/or a high-speed data connection for the robots. For example, the locking mechanism used to secure a robot within the AV can include a power and/or data capable that connects to the robot while the robot is secured and charges the robot and/or provides a data connection to the robot. In some examples, the AV controller can be connected to internal and/or external sensors that can inspect the robot's health and integrity. For example, the AV controller can obtain data from one or more sensors that can inspect one or more properties of a robot such as, for example and without limitation, a state of charge, a state of health of a battery of the robot, a condition of one or more hardware systems of the robot, a condition of software implemented by the robot, etc. In some examples, the AV controller can activate an audio/video system within the AV to generate video and/or audio signals to assist the robots in completing any necessary calibration and/or to detect one or more conditions of the robots that can be assessed visually and/or through audio.

In some examples, the AV cabin can be equipped to dispense supplies, such as water or detergent, to the robots while the robots are fastened to their designated area within the AV. The need to replenish supplies (e.g., water, detergent, etc.) can be communicated by the robot(s) to the AV controller, or alternatively can be detected by the AV controller using data from one or more sensors in the AV. In some examples, a disposal mechanism can be used to collect used materials that the robots have accumulated during an assigned task (such as dust or dirt, for example).

In some cases, the AV controller can manage the timing of the driving and/or preparation activities used to orchestrate the process. Preparation activities can include, but are not limited to, recharging the robot's battery or power supply, transmitting data to the robot and/or receiving data from the robot, supplying the robot with cleaning materials and/or water, waste collection, and/or testing hardware and/or software systems of the robot, among others. In some cases, the AV controller can make a determination to abandon a robot at a location if necessary. In this scenario, the AV controller can schedule a subsequent time or a separate AV to return and pick up the previously abandoned robot.

Examples of the systems and techniques described herein are illustrated in FIG. 1 through FIG. 7 and described below.

FIG. 1 is a diagram illustrating an example autonomous vehicle (AV) environment 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and/or the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and/or other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, stop or park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUS, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from the map management platform 162 and/or a cartography platform; modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. In some cases, the client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some examples, the map viewing services of map management platform 162 can be modularized and deployed as part of one or more of the platforms and systems of the data center 150. For example, the AI/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit to a pick-up or drop-off location, and so on.

While the AV 102, the local computing device 110, and the autonomous vehicle environment 100 are shown to include certain systems and components, one of ordinary skill will appreciate that the AV 102, the local computing device 110, and/or the autonomous vehicle environment 100 can include more or fewer systems and/or components than those shown in FIG. 1. For example, the AV 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
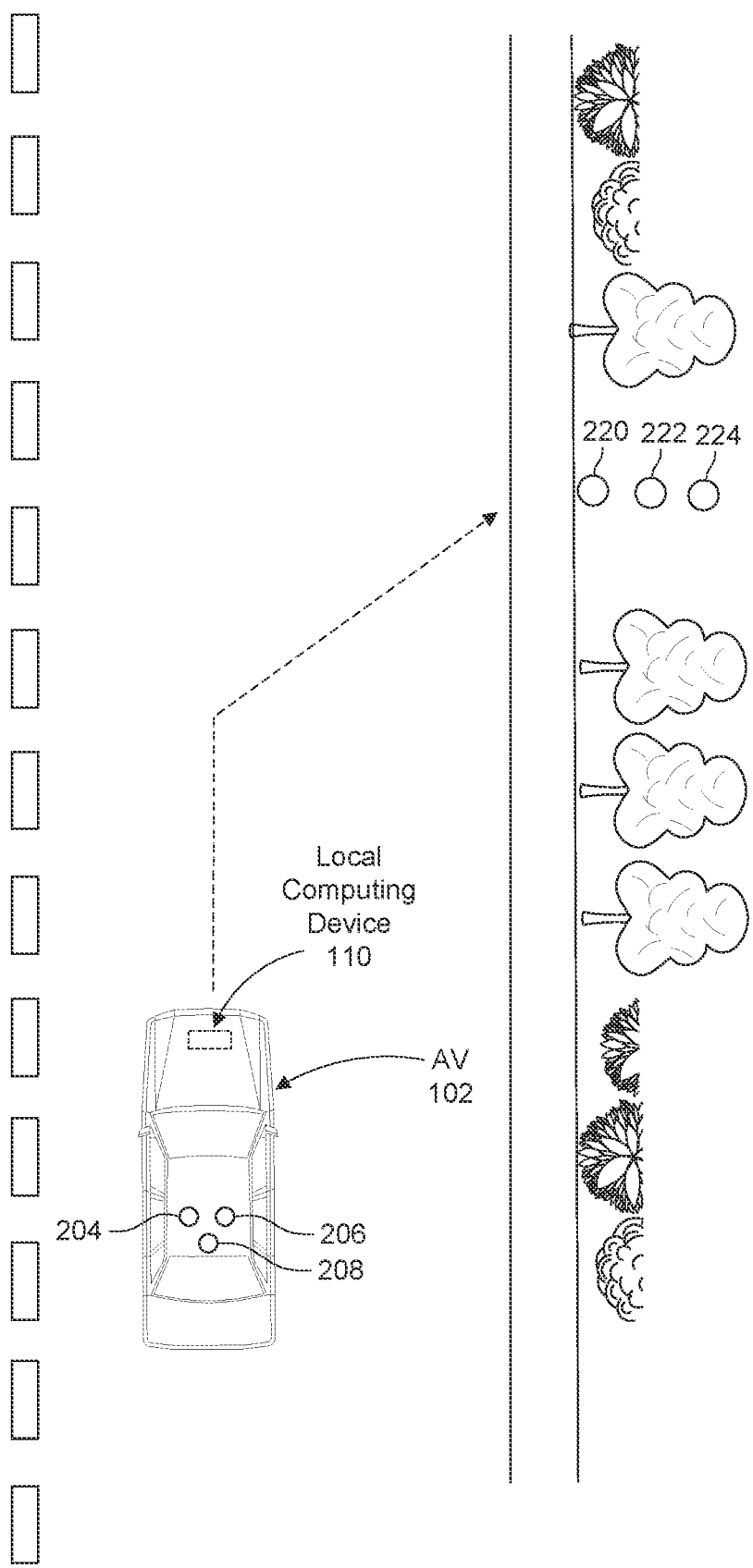
FIG. 2 is a diagram illustrating an example autonomous vehicle approaching a location within proximity to a plurality of robots, in accordance with some examples of the present disclosure.

FIG. 2 is a diagram illustrating an example autonomous vehicle 102 approaching a location within a proximity to a plurality of robots. In this example, an AV 102 includes a local computing device 110. An illustrative example of a computing device and hardware components that can be implemented with the local computing device 110 is described below with respect to FIG. 7. The local computing device 110 can be in communication with the sensor systems 104-108, the mechanical systems 130-138, the data center 150, the client computing device 170, and/or robots 220, 222, and 224, among other systems. The AV 102 includes destinations 204, 206, and 208 for securing robots 220, 222, and 224, respectively. The destinations 204, 206, and 208 can include locations within the cabin of the AV 102 where the robots 220, 222, 224 can be secured and transported.

The local computing device 110 can receive instructions to provide a robot or multiple robots to a destination location(s) where the robot should be transported and/or to permit the robot to accomplish a task or tasks. In the example illustrated in FIG. 2, the local computing device 110 receives an instruction to retrieve robots 220, 222, and 224 from a particular location(s). The local computing device 110 can determine, based on data from one or more sensors, a location to enable the robots 220, 222, and 224 to enter the AV 102. The location can be a location within a proximity to the robots 220, 222, and 224, and/or a location where the local computing device 110 has determined that a ramp can be deployed to allow the robots to enter the AV 102. Further, the local computing device 110 can determine, based on data from one or more sensors, a location to enable the robots 220, 222, and 224 to enter the AV 102. The location can be a location that the local computing device 110 determines is free of obstacles (or obstacles having a threshold size and/or dimensions) such as the various trees and bushes illustrated in FIG. 2. The location where the AV 102 retrieves the robots 220, 222, and 224 should be free of obstacles that impede the ability of the robots 220, 222, and 224 to approach and enter the AV 102 and/or impede the deployment of a ramp that the robots can use to enter the AV 102 (and/or causes the ramp to have a threshold instability due to, for example, the obstacles preventing sufficient support of one end of the ramp that sits on the ground and/or the obstacles changing an angle of the ramp when deployed). Therefore, as shown in FIG. 2, the local computing device 110 instructs the AV 102 to approach the location indicated by the dotted line that is both within a proximity to the plurality of robots 220, 222, and 224 and free of obstacles (or free of obstacles having a threshold size and/or dimensions). In order to facilitate the planning of the AV 102 approaching the robots 220, 222, and 224, AV 102 can use the Planning stack 118 that is otherwise used for planning of AV driving operation. In order to facilitate this, multiple different scenarios that lead to a path to robots 220, 222, and 224 are generated, and each scenario is evaluated for successful ramp deployment. In some examples, if a scenario has the AV 102 stopping in front of a tree that blocks the ramp, that scenario is discarded for planning. The feasibility of deployment of ramp can be calculated using heuristics that checks the free space in front of the ramp that is detected by Perception stack 112, or a mechanical simulation of the ramp based on objects that are detected by the Perception stack 112.

The local computing device 110 is also in communication with the robots 220, 222, 224. For example, the local computing device 110 can communicate wirelessly (e.g., using Bluetooth, WIFI, cellular, and/or any other wireless protocol/technology) with the robots 220, 222, 224. The local computing device 110 can also communicate using the signals generated by one of the active sensors (LIDAR, RADAR, ultrasound) using one of the existing communication protocols. The local computing device 110 can instruct the robots to move to a location free of obstacles that will not impede the ability of the robots 220, 222, and 224 to approach and enter the AV 102. In some examples, the local computing device 110 can communicate, to the robots 220, 222, 224, information to guide the robots 220, 222, 224, such as, for example, coordinates of a destination within the AV 102, dimensions of a ramp deployed to allow the robots to enter the AV 102, a position of the ramp, coordinates and/or details of a path the robots can follow from their location outside of the AV 102 to a location within the AV 102 and through the ramp, etc. The local computing device 110 can also communicate data to the robots 220, 222, and 224, including but not limited to, timing data, location data, instructions for being secured within the AV 102, instructions for where to stop within the AV 102, and task data. The robots 220, 222, and 224 can be waiting at a location determined by AV 102 prior to the approach of AV 102 based on information received from local computing device 110.

Figure 3:
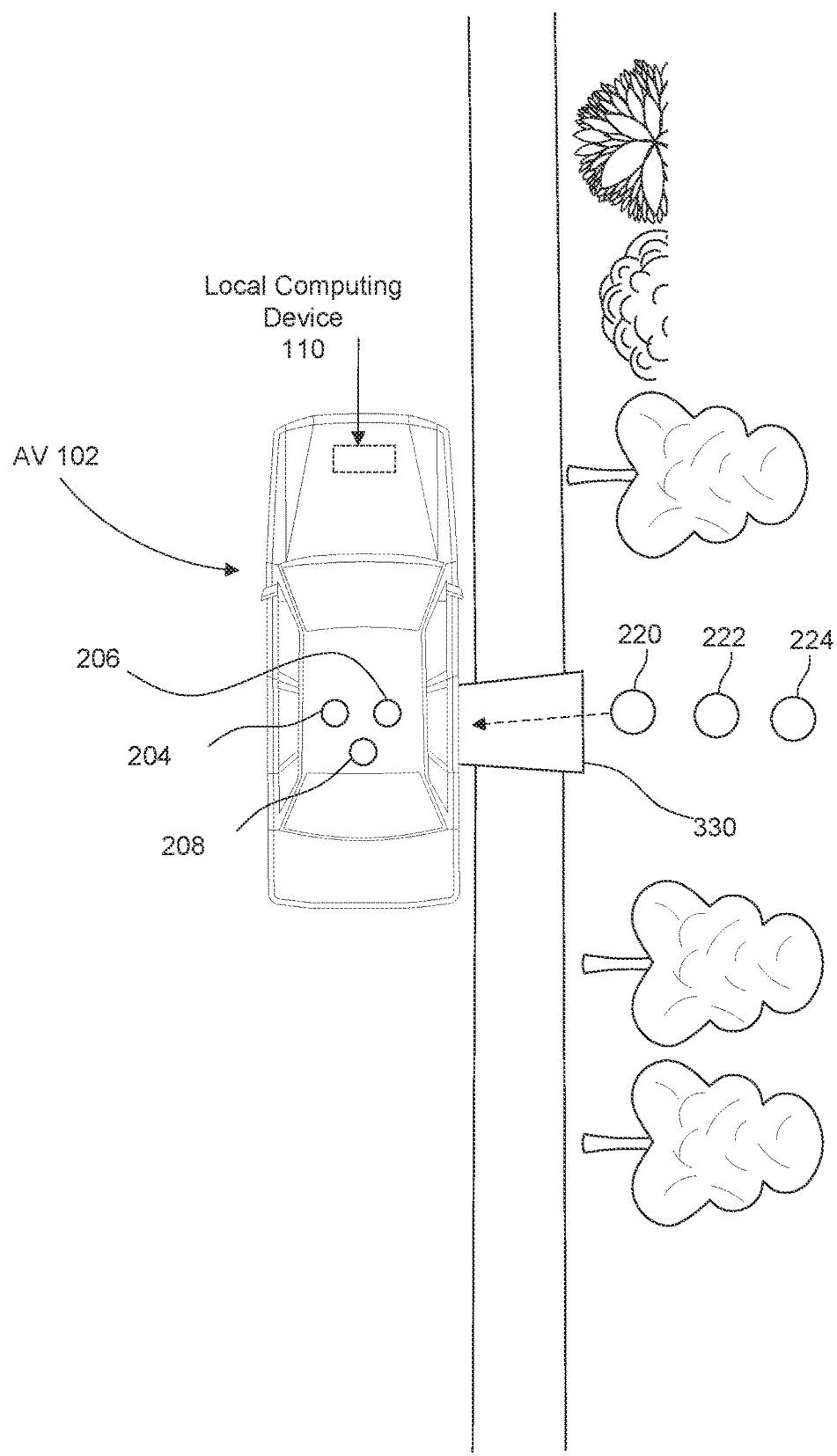
FIG. 3 is a diagram illustrating an example ramp deployed by a stopped autonomous vehicle located within proximity to a plurality of robots, in accordance with some examples of the present disclosure.

FIG. 3 is a diagram illustrating an example ramp 330 deployed by a stopped AV 102 located within proximity to a plurality of robots 220, 222, and 224. In this example, the local computing device 110 has instructed the AV 102 to approach and stop at a location within threshold proximity to robots 220, 222, and 224. In some examples, the threshold can be 1 feet to 1000 feet depending on the tolerance of the robot travel, wait times, and difficulties in finding stopping location based on operational considerations. The local computing device 110 can receive a request to transport the robots 220, 222, 224 from an pick-up location to a destination location. The request can specify where the pick-up location is and where the destination location is. The local computing device 110 can instruct or guide the AV 102 to the pick-up location to pick-up the robots 220, 222, 224 and, after picking-up the robots 220, 222, 224, the local computing device 110 can instruct or guide the AV 102 to the destination location. When the AV 102 arrives at the pick-up location to pick-up the robots 220, 222, 224, the local computing device 110 can instruct or guide the AV 102 to stop at a particular location where the AV 102 can deploy the ramp 330 and the robots 220, 222, 124 can enter the AV 102 using the ramp 330 without being blocked or impeded by obstacles at that particular location. Thus, the local computing device 110 can obtain data from one or more sensors of the AV 102 (e.g., from a camera sensor, a LIDAR sensor, a RADAR sensor, an IMU, a TOF sensor, and/or any other sensor).

The data from the one or more sensors can depict and/or describe characteristics of the particular location such as, for example and without limitation, an angle or inclination of a surface at that particular location, whether there are any obstacles in the particular location, the location of detected obstacles (if any) at the particular location, the dimensions of detected obstacles (if any) at the particular location, and/or any attributes of a surface(s) and/or obstacles at the particular location. The local computing device 110 can use such information from the sensor data to determine where to deploy the ramp 330 and/or verify that the ramp 330 can be deployed (fully or partially up to a threshold amount of deployment or extension) without any obstacles preventing the ramp 330 from being sufficiently deployed and/or from being stable when deployed (e.g., because of an uneven supporting surface created by obstacles in the ground surface where one end of the ramp 330 would lay, because of a deployment angle (e.g., a pitch angle, a roll angle, etc.) of the ramp 330 caused or influenced by one or more obstacles or a configuration of the ground surface, etc.). The local computing device 110 can also use such information from the sensor data to verify that a path from a location of the robots 220, 222, 224 through the ramp 330 and to the inside of the AV 102 is not blocked or impeded by one or more obstacles.

For example, the local computing device 110 can use the sensor data to determine whether there are any obstacles (e.g., objects, pot holes, uneven areas in a ground surface that could impeded a path of the robots 220, 222, 224 to the ramp, etc.) in an area where the local computing device 110 is considering deploying the ramp 330. If the local computing device 110 determines that there are no obstacles (or no obstacles having a threshold dimension that could prevent or impede the robots 220, 222, 224 from accessing the ramp 330 and/or traversing to the ramp 330) and/or that the ramp 330 can be deployed at the particular location and when deployed would be sufficiently stable to allow the robots 220, 222, 224 to cross the ramp 330 to enter the AV 102 without a threshold risk of the robots 220, 222, 224 falling from the ramp 330 due to an instability of the ramp 330 (e.g., caused by obstacles on a ground surface or a geometry of the ground causing an angled and/or uneven path through the ramp 330), the local computing device 110 can instruct the AV 102 to deploy the ramp 330 at the particular location. The local computing device 110 can guide the deployment of the ramp 330 by the AV 102. For example, the local computing device 110 can provide the AV 102 specific coordinates for stopping at an area that will allow the AV 102 to deploy the ramp 330 at the particular location and/or can provide the AV 102 instructions indicating where to stop and/or a pose the AV 102 should achieve when stopping to allow the ramp 330 to be deployed from a particular direction and/or angle relative to the robots 220, 222, 224 and/or relative to one or more objects or items in a scene. The determination of ease of deployability of the ramp can be made by checking the path of the ramp for any obstructions. In some examples, this can be accomplished by comparing the volume that the ramp will occupy during deployment and operation with the freespace map from perception 112 that indicates which areas in the 3D space are empty. The determination of the volume that the ramp will occupy can be pre-calculated before operation from the shape of the ramp, actuating mechanism of the ramp, and geometrical calculations that project the position of the ramp at different stages of deployment. In some examples, the determination of ease of deployability can also be made based on a mechanical simulation in 3D with the objects in the vicinity of the AV 102. The deployability may be a binary where a particular stopping location may be considered either ramp deployable or non-ramp deployable. The deployability may also have more levels or a floating point number to indicate the favorability of the location. For example, a location that has more spacing to surrounding obstacles may be considered to be more favorable compared to one that has less spacing.

Once the AV 102 has stopped at the location, the local computing device 110 instructs the AV 102 to deploy a ramp 330 to permit the robots 220, 222, 224 to enter the cabin of the AV 102 via the ramp 330. Prior to deploying the ramp 330, the local computing device 110 can detect the surroundings of the AV 102 using sensor data to determine a ramp deployment plan that avoids the ramp 330 contacting any unwanted objects and/or obstacles (e.g., any objects/obstacles having a threshold size and/or dimension, etc.) and/or that avoids the ramp 330 contacting an uneven ground surface (e.g., a ground surface having a threshold angle/inclination, curvature, and/or geometry). The ramp deployment plan determined by the local computing device 110 can also account for the robot's 220, 222, and 224 path in order to avoid causing the robots 220, 222, and 224 to contact unwanted objects that may interfere with the robot's 220, 222, and 224 ability to enter the cabin of AV 102 via ramp 330. In some examples, the ramp deployment plan may also include the weather considerations, wetness of the ramp, inclination of the ramp, speed of robots, traction of robots wheels or surfaces that contact the ground. For example, if the ramp is wet, deployment plan may include stopping at a location where inclination of the ramp is lower.

Figure 4:
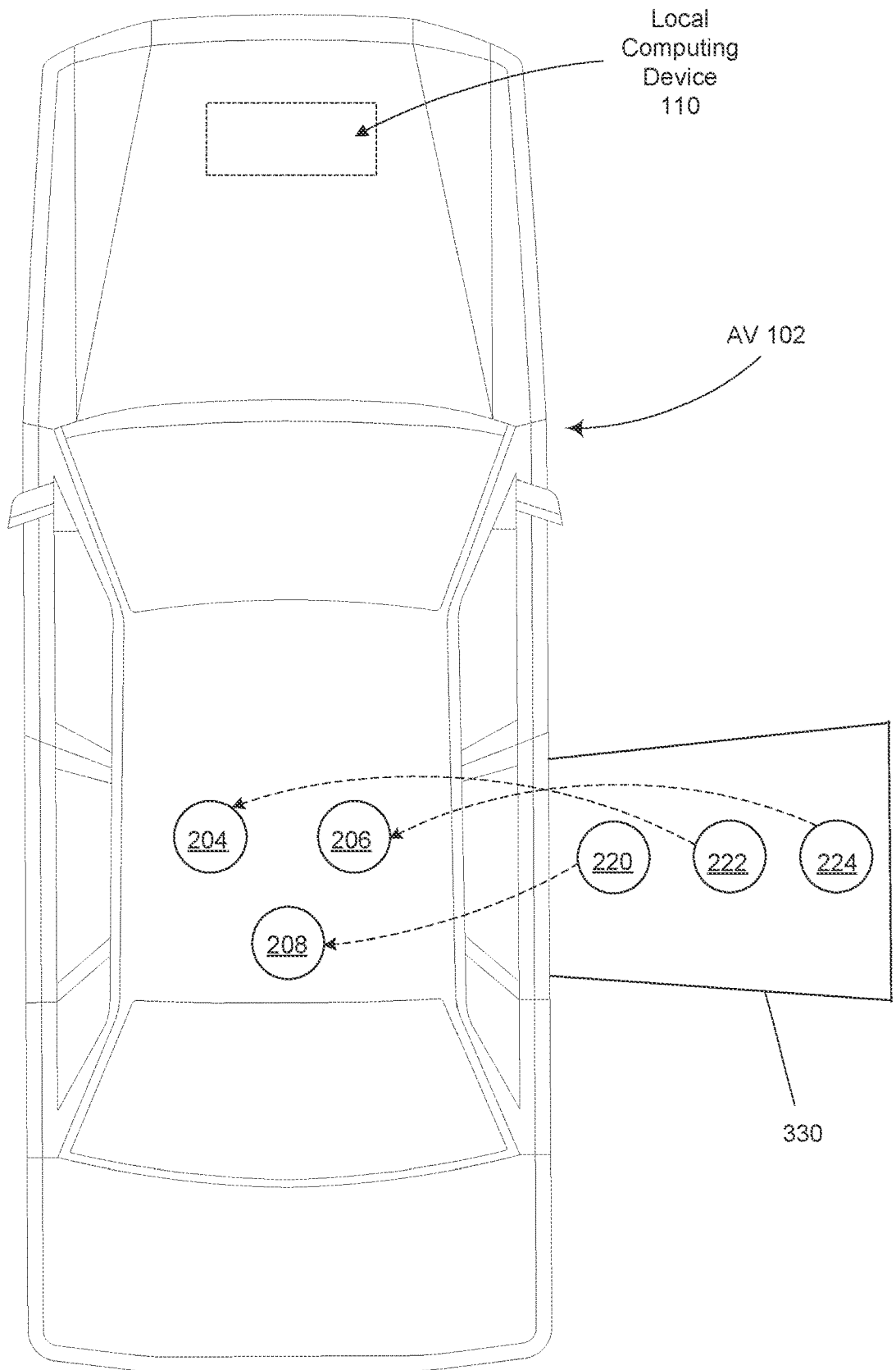
FIG. 4 is a diagram illustrating a plurality of robots located on the deployed ramp of an autonomous vehicle moving in the direction toward their respective locations within the cabin of the autonomous vehicle, in accordance with some examples of the present disclosure.

FIG. 4 is a diagram illustrating robots 220, 222, and 224 located on the deployed ramp 330 of AV 102. The dotted arrows indicate that the robots 220, 222, and 224 are moving in the direction toward their respective locations (destinations) 204, 206, and 208, within the cabin of AV 102. The local computing device 110 can communicate with the robots 220, 222, and 224, to provide them with instructions indicating that AV 102 has arrived and that the robots 220, 222, and 224 may enter the cabin of AV 102 via the ramp 330. The local computing device 110 can also guide the robots 220, 222, 224 up the ramp 330. For example, the local computing device 110 can provide coordinates and/or can define a path the robots 220, 222, 224 should take up the ramp 330 and into the AV 102.

In some examples, each robot 220, 222, and 224 can be instructed (e.g., by the local computing device 110) to continue into the cabin of AV 102 until it reaches a specific position (or "destination") within the cabin of AV 102. For example, FIG. 4 illustrates that robot 220 has received instructions from local computing device 110 to proceed to destination location 208, robot 222 has received instructions from local computing device 110 to proceed to destination location 204, and robot 224 has received instructions from local computing device 110 to proceed to destination location 206. The local computing device 110 can provide instructions to the robots 220, 222, and 224 comprising a particular order that the robots should enter the cabin of AV 102.

In some examples, once the robots 220, 222, and 224 have all reached their destination locations 204, 206, and 208, a locking mechanism can be employed to secure the robots within the cabin of AV 102 in the prescribed locations. A locking mechanism helps to provide security and avoid potential damage to the robots 220, 222, and 224 by providing a physical restraint as they travel to their destination. The locking mechanisms can include any means of securing a robot to the cabin of AV 102, including but not limited to, a mechanical latch and a magnetic means. In some examples, the locking mechanisms can additionally serve as a power supply for recharging the robots, and/or a data communication conduit for transferring data between the AV 102 and the robots 220, 222, 224. Such data can include but is not limited to task-related instructions for the robot. In some examples, the locking mechanisms can additionally serve as, or be associated with, a means for supplying robots 220, 222, and 224 with task-related materials. Such task-related materials can include, but are not limited to, cleaning formulas and water. In some examples, the locking mechanisms can additionally serve as, or be associated with, a means for collecting unwanted waste materials from the robots 220, 222, and 224 after completion of a task. For example, a robot tasked with vacuuming may need to deposit the collected dust and waste particles before it is available to be used again. The AV 102 can collect the waste materials for later removal to the appropriate garbage container at a later time.

In some examples, the local computing device 110 can instruct the AV 102 to inspect the robots 220, 222, and 224 to determine the health of the robots. For example, the various cameras and sensors located within AV 102 can be used to detect defects or problems associated with robots 220, 222, and 224. Some examples of such defects can include, but are not limited to, cracks, moisture, and dirt on the robots 220, 222, and 224. In some examples, AV 102 can include various internal peripheral devices that can perform various calibrations on the robots 220, 222, and 224. For example, a calibration image (grid) can be employed by the AV 102 to calibrate a camera of a robot. Further examples include calibrating the audio systems of the robot using a tone emitted by AV 102, and calibrating the LIDAR system of the robot by physically moving an item connected to AV 102 (such as opening a door).

Figure 5:
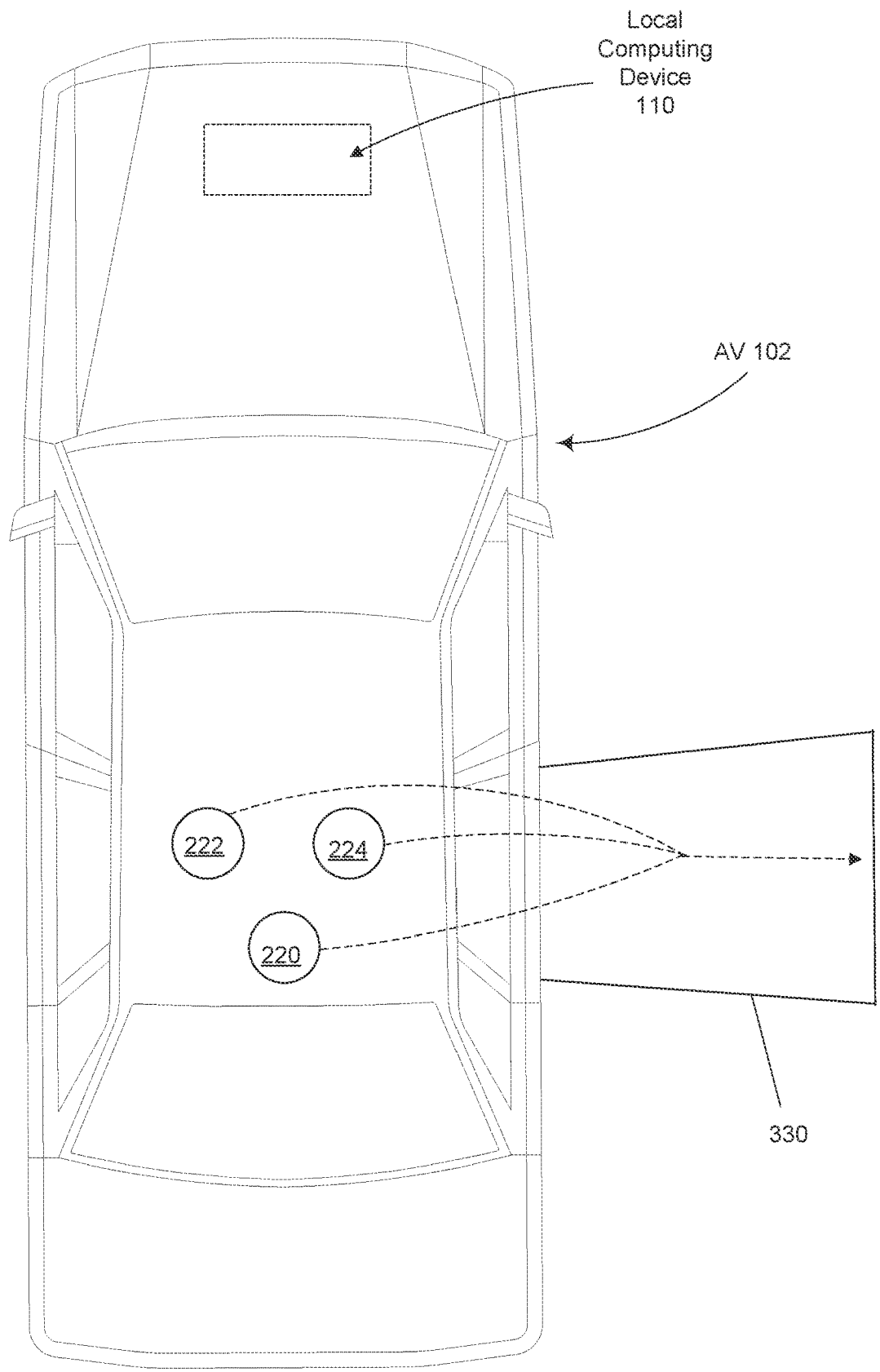
FIG. 5 is a diagram illustrating a plurality of robots located within the cabin of an autonomous vehicle positioned at their respective locations, in accordance with some examples of the present disclosure.

FIG. 5 is a diagram illustrating a plurality of robots 220, 222, and 224 located within the cabin of AV 102, positioned at their respective destination locations. FIG. 5 illustrates that AV 102 has arrived at its destination and AV controller has instructed AV 102 to deploy ramp 330. Specifically, once the AV 102 has stopped at the destination, the local computing device 110 instructs the AV 102 to deploy a ramp 330 to permit the robots 220, 222, and 224 to exit the cabin of the AV 102 via the ramp 330. Prior to deploying the ramp 330, the AV controller can detect the surroundings of the AV using sensor data to determine a ramp deployment plan that avoids the ramp contacting any unwanted objects. The ramp deployment plan determined by the local computing device 110 can also account for the robot's 220, 222, and 224 exit path in order to avoid causing the robots 220, 222, and 224 to contact unwanted objects that may interfere with the robot's 220, 222, and 224 ability to exit the cabin of AV 102 via ramp 330 and proceed to the final destination.

In some examples, local computing device 110 can provide mission instructions to the robots 220, 222, and 224. For example, in the scenario where robots 220, 222, and 224 are deployed for purposes of a cleaning job, local computing device 110 can generate instructions, or receive information from the operation center or dispatch providing instructions, indicating what to clean, where to clean, and any special requests (such as, for example, avoidance areas). The local computing device 110 can subsequently communicate this information to the robots 220, 222, and 224 prior to deployment. In some examples, the information indicating what to clean can include a description of areas, objects, surfaces, and/or any cleaning targets; a description of the location of the areas, objects, surfaces, and/or cleaning targets; a description of the location of the areas, objects, surfaces, and/or cleaning targets; etc. In some examples, the information indicating where to clean can include location information such as, for example and without limitation, coordinates of the areas, objects, surfaces, and/or cleaning targets; a respective map of a physical space indicating the location of the areas, objects, surfaces, and/or cleaning targets within the respective map; the position of the areas, objects, surfaces, and/or cleaning targets relative to a reference point such as a current or starting location of the robots 220, 222, 224 and/or the AV 102; other location information regarding where to exit the AV 102 to access the areas, objects, surfaces, and/or cleaning targets for cleaning by the robots 220, 222, 224; etc.

In some cases, the mission instructions can include instructions specifying or describing one or more actions/operations that the robots 220, 222, 224 should perform at a destination location, one or more commands for executing the one or more actions/operations, instructions on how to egress the AV 102 and/or access any area/region and/or location where the robots 220, 222, 224 are to perform the one or more actions/operations, instructions on how to request additional information about the one or more actions/operations that the robots 220, 222, 224 should perform and/or how to ask any questions (e.g., the target entity that can help with any questions, support requests, and/or additional information; a map of the environment relating to the one or more actions/operations; how to contact (e.g., an electronic address such as an Internet Protocol address or a phone number) the target entity; etc.); how to initiate a request for support/troubleshooting; and/or any other information about the actions/operations and/or the associated environment.

Figure 6A:
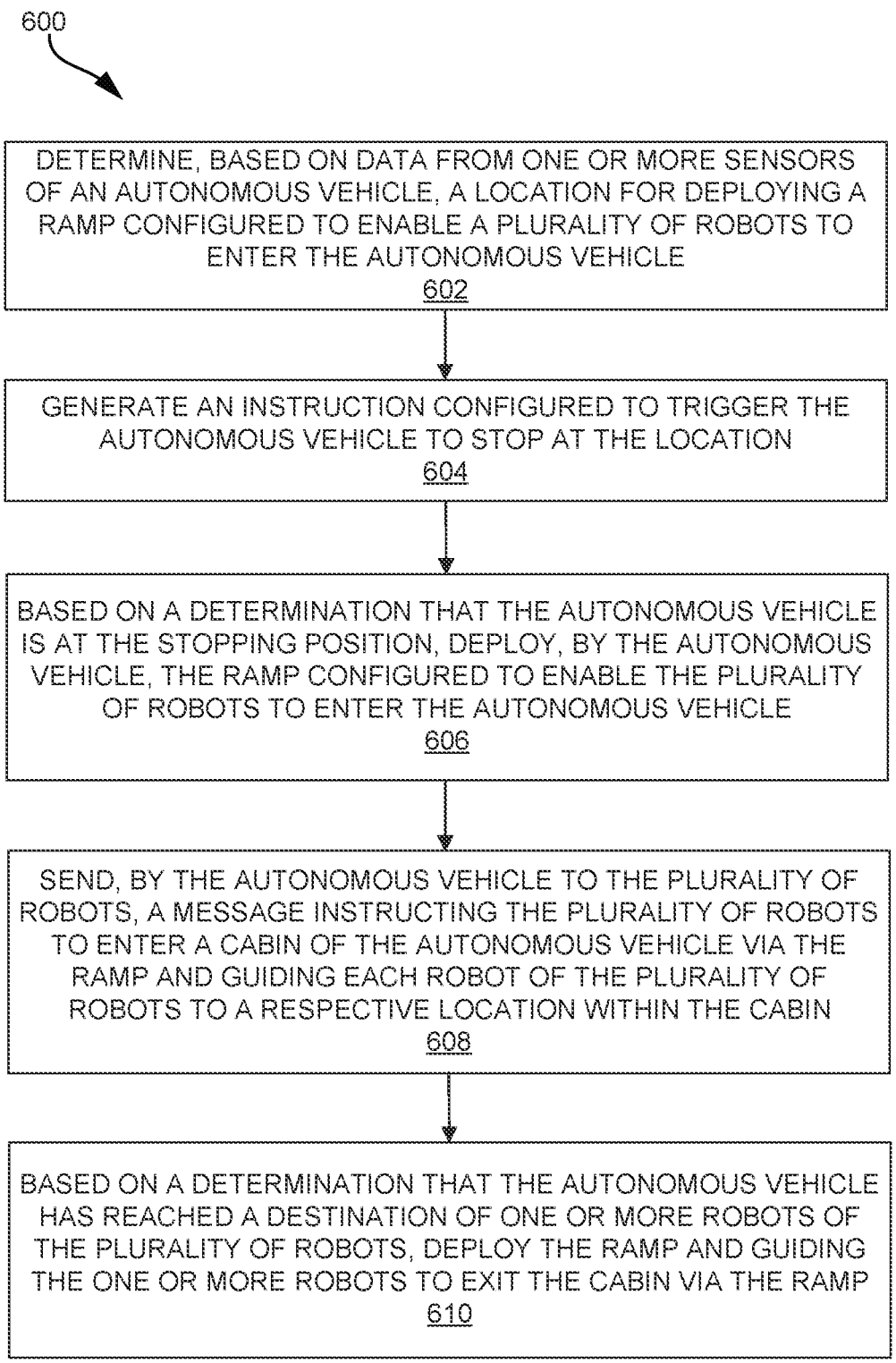
FIG. 6A is a flowchart illustrating an example process for delivery and management of autonomous robots by an autonomous vehicle, in accordance with some examples of the present disclosure.

FIG. 6A is a flowchart illustrating an example process 600 for delivery and management of autonomous robots by an AV. At block 602, the process 600 can include determining, based on data from one or more sensors of an autonomous vehicle (e.g., AV 102), a location for deploying a ramp (e.g., ramp 330) configured to enable a plurality of robots (e.g., robots 220, 222, and 224) to enter the autonomous vehicle. In some examples, the location can be within a proximity to the plurality of robots. In some cases, the location can include an area that is free of obstacles having one or more dimensions above a threshold. The one or more dimensions can include at least one of a depth, a width, and a height.

At block 604, the process 600 can include generating an instruction configured to trigger the autonomous vehicle to stop at the location. In some examples, the instruction can indicate a stopping position within the location for the autonomous vehicle. The stopping position can be relative to at least one of a street, a sidewalk, an object, and respective locations of the plurality of robots.

At block 606, the process 600 can include, based on a determination that the autonomous vehicle is at the stopping position, deploying, by the autonomous vehicle, the ramp configured to enable the plurality of robots to enter the autonomous vehicle. For example, once the AV 102 has stopped at the location, the local computing device 110 instructs the AV 102 to deploy a ramp (e.g., ramp 330) to permit the robots 220, 222, and 224 to enter the cabin of the AV 102 via the ramp.

At block 608, the process 600 can include sending, by the autonomous vehicle to the plurality of robots, a message instructing the plurality of robots to enter a cabin of the autonomous vehicle via the ramp and guiding each robot of the plurality of robots to a respective location within the cabin. In some examples, the message can include an indication of an order in which the plurality of robots should enter the cabin. For example, each robot of the plurality of robots (e.g., robots 220, 222, and 224) can be instructed (e.g., by the local computing device 110) to continue into the cabin of AV 102 until it reaches a specific position (or "destination") within the cabin of AV 102.

At block 608, the process 600 can include, based on a determination that the autonomous vehicle has reached a destination of one or more robots of the plurality of robots, deploying the ramp and guiding the one or more robots to exit the cabin via the ramp. For example, once the AV 102 has stopped at the destination, the local computing device 110 instructs the AV 102 to deploy a ramp (e.g., ramp 330) to permit the plurality of robots (e.g., robots 220, 222, and 224) to exit the cabin of the AV 102 via the ramp.

In some aspects, the process 600 can include using sensors of the AV 102 to determine an optimal location to deploy the ramp (e.g., ramp 330) that avoid obstacles. An optimal location can include a location that is free of obstacles of a threshold dimension (e.g., a threshold width, height, length, depth, etc.) and/or having less than a threshold amount of curvature, angle, and/or instability. In some aspects, the process 600 can include activating (e.g., by the AV 102) a locking mechanism to secure the plurality of robots within the AV 102. In some aspects, the process 600 can include a cable, charger, and/or connector to charge the plurality of robots and/or a cable and/or connector to exchange data with the plurality of robots. In some aspects, the process 600 can include equipping the AV 102 to provide supplies to the plurality of robots while each robot of the plurality of robots is secured within AV 102. In some aspects, the process 600 can include equipping the AV 102 to collect used materials from the plurality of robots while each of the plurality of robots is secured within AV 102. In some aspects, the process 600 can include using sensors to inspect the health of the plurality of robots.

In some examples, the AV 102 can provide mission instructions to one or more of the robots. For example, if a robot(s) is being deployed for a cleaning job, the AV 102 can receive information about what the robot(s) should clean, where to clean, and/or any special requests (e.g., avoidance areas, etc.). The AV 102 can then communicate the mission plan to the robot(s) prior to deployment. For example, the AV 102 can transport the robot(s) to the deployment location, guide the robot(s) out of the AV 102 as previously described, and communicate mission instructions to the robot(s) before, during, or after guiding the robot(s) out of the AV 102.

FIG. 6B is a flowchart illustrating another example process 620 for delivery and management of autonomous robots by an AV. At block 622, the process 622 can include preparing one or more robots from the robots 220, 222, 224 for a target operation/task of the one or more robots at a destination location. In some examples, the local computing device 110 can prepare the one or more robots for the target operation/task before the one or more robots are released at the destination location or before the one or more robots begin the target operation/task at the destination location. The destination location can include a location, area, region, and/or destination where the one or more robots are to be released for the target operation/task and/or where the one or more robots are to perform the target operation/task. In some examples, preparing the one or more robots can include sending information about the target operation/task and/or the destination location to the one or more robots, sending instructions to the one or more robots that the one or more robots can use to (or to help to) perform the target operation/task, instructions on how to open a communication channel (e.g., a phone or video call, a messaging session, and/or any other communication session via an address (e.g., an Internet Protocol address), phone number, etc., and/or protocol(s)) with a particular computing device (e.g., local computing device 110, a remote computing device, a cloud, etc.) from which the one or more robots can obtain any information, support/help, and/or requests, sending mission instructions to the one or more robots, etc.

For example, before the one or more robots begin a target operation/task (e.g., cleaning an area, inspecting an area, fixing an object, obtaining sensor data at a location to be measured/analyzed, and/or performing any other action/activity/operation) at a destination location of the one or more robots, the local computing device 110 can calibrate the one or more robots and/or one or more tools/components of the one or more robots for use in the target operation/task, transmit information (e.g., instructions, location information, a map, any exceptions, etc.) to the one or more robots about the target operation/task, initiate one or more hardware and/or software components of the one or more robots, checking the one or more robots before they start the target operation/task (e.g., checking one or more tools/components of the one or more robots, checking a software of the one or more robots, testing one or more actions by the one or more robots, validating one or more capabilities of the one or more robots, etc.), establishing a communication channel (or instructing the one or more robots on how to establish a communication channel) between the one or more robots and one or more computing devices that the one or more robots can communicate with during the target operation/task (e.g., that the one or more robots can ask questions to, receive support/troubleshooting from, receive additional information from, etc.), instructions for how to exit the AV 102 and/or reach an area at the destination location where the one or more robots should perform the target operation/task, instructions on how to enter the AV 102 after completing the target operation/task, etc.

In some cases, before or after preparing the one or more robots at block 622, the process 600 can include sending, by the AV 102 (e.g., via the local computing device 110) to the one or more robots, a message instructing the one or more robots to enter a cabin of the AV 102 via the ramp and guiding each robot to a respective location within the cabin. For example, if the one or more robots are being picked-up by the AV 102 from a pick-up location to be transported to the destination location of the one or more robots so the one or more robots can perform the target operation/task, the AV 102 can send the one or more robots a respective message instructing the one or more robots where the AV 102 is located (e.g., where the AV 102 has stopped to allow the one or more robots to enter the AV 102), how the one or more robots can enter the AV 102, and/or where the one or more robots should position themselves within the AV 102 to be transported by the AV 102 to the destination location where the one or more robots will be taken to perform the target operation/task. As another example, if the one or more robots have completed an operation/task at a specific location and are ready to be taken to the destination location where the one or more robots will be performing the target operation/task, the AV 102 can send a respective message to the one or more robots instructing them to enter (and/or how to enter) the AV 102 to be taken to the destination location.

In some examples, the respective message from the AV 102 (e.g., from the local computing device 110 of the AV 102) can include an indication of an order in which the one or more robots should enter the AV 102 (and/or a cabin of the AV 102). For example, each robot can be instructed (e.g., by the local computing device 110) to continue into the cabin of AV 102 until it reaches a specific position (or "destination") within the cabin of AV 102.

At block 624, the process 620 can include based on a determination that the AV 102 is at the destination location, deploying, by the AV 102, a ramp configured to enable the one or more robots to enter the AV 102. For example, once the AV 102 has stopped at the destination location, the local computing device 110 of the AV 102 can instruct the AV 102 to deploy a ramp (e.g., ramp 330) to permit the one or more robots to enter the cabin of the AV 102 via the ramp.

In some aspects, the process 620 can include using sensors of the AV 102 to determine a particular location to deploy the ramp that avoid obstacles of a threshold size, configuration, obstruction, geometry, etc. In some examples, the location can include a location that is free of obstacles of a threshold dimension (e.g., a threshold width, height, length, depth, etc.) and/or having less than a threshold amount of curvature, angle, and/or instability. In some aspects, the process 620 can include activating a locking mechanism to secure the one or more robots within the AV 102. In some aspects, the process 620 can include a cable, charger, and/or connector to charge the one or more robots, and/or a cable and/or connector to exchange data with the one or more robots. In some aspects, the process 620 can include equipping the AV 102 to provide supplies to the one or more robots while the one or more robots are secured within AV 102. In some aspects, the process 620 can include equipping the AV 102 to collect used materials from the one or more robots while the one or more robots are secured within AV 102. In some aspects, the process 620 can include using sensors of the AV 102 to inspect the health of the one or more robots.

In some examples, the AV 102 can provide mission instructions to the one or more robots. For example, if the one or more robots are being deployed for a cleaning job, the AV 102 can provide the one or more robots information about what should be cleaned, where to clean, and/or any special requests (e.g., avoidance areas, etc.). The AV 102 can communicate the mission plan to the one or more robots prior deploying the one or more robots or after the AV 102 deploys the one or more robots but prior to the one or more robots commencing their target operation/task.

At block 626, the process 600 can include sending, by the AV 102 (e.g., via the local computing device 110) to the one or more robots after the one or more robots complete the target operation/task, instructions on how to return to the AV 102 and/or enter the AV 102 to be transported from the destination location to another destination location such as, for example, the location of a next target operation/task, a storage location where the one or more robots are stored, a drop-off location for the one or more robots, and/or any other location.

For example, at block 626, the AV 102 can send, to the one or more robots, a message instructing the one or more robots to enter a cabin of the AV 102 via the ramp and guiding each robot to a respective location within the cabin. To illustrate, the AV 102 can send the one or more robots a respective message instructing the one or more robots where the AV 102 is located (e.g., where the AV 102 has stopped or parked), how the one or more robots can enter the AV 102, and/or where the one or more robots should position themselves within the AV 102 to be transported by the AV 102 to the destination location where the one or more robots will be taken to perform the target operation/task.

In some aspects, the process 620 can further include sending, by the AV 102 (e.g., via the local computing device 110) to the one or more robots, maintenance instructions that instruct the one or more robots to (and/or how to) perform a maintenance task such as, for example and without limitation, cleaning, disposing materials, re-charging, performing a health check, analyzing an area after completing an operation/task on that area, etc. For example, once the one or more robots have completed the target operation/task, the AV 102 can instruct the one or more robots to perform (and/or how to perform) a particular maintenance task(s) that the one or more robots should perform after completing the target operation/task and/or before starting another operation/task.

Figure 7:
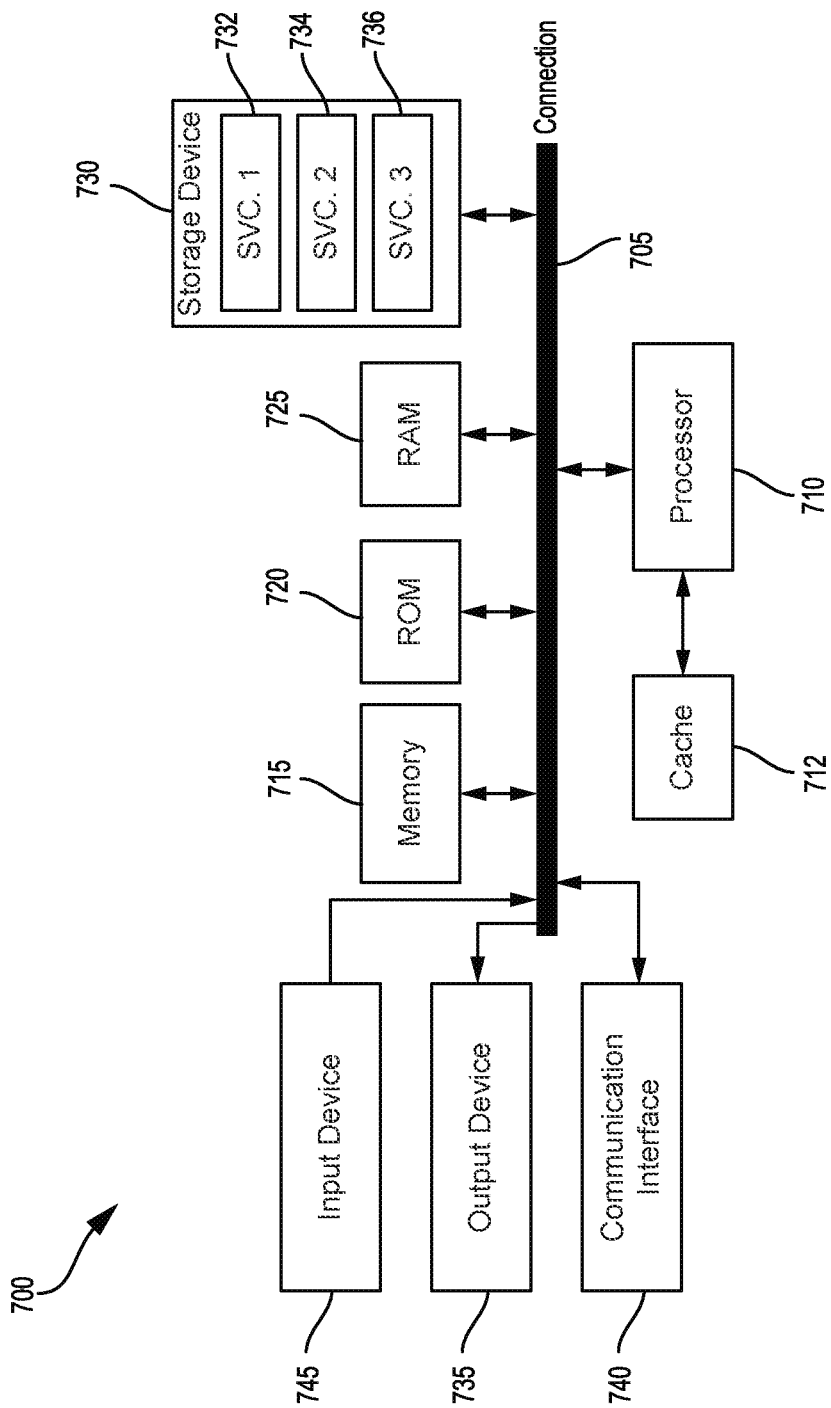
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up local computing device 110, client computing device 170, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

The various examples described above are provided by way of illustration only and should not be construed to limit the scope of the disclosure. For example, the principles herein apply equally to optimization as well as general improvements. Various modifications and changes may be made to the principles described herein without following the example aspects and applications illustrated and described herein, and without departing from the spirit and scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. A method comprising: determining, based on data from one or more sensors of an autonomous vehicle, a location for deploying a ramp configured to enable a plurality of robots to enter the autonomous vehicle, wherein the location is within a proximity to the plurality of robots, and wherein the location comprises an area that is free of obstacles having one or more dimensions above a threshold, the one or more dimensions comprising at least one of a depth, a width, and a height; generating an instruction configured to trigger the autonomous vehicle to stop at the location, the instruction indicating a stopping position within the location for the autonomous vehicle, the stopping position being relative to at least one of a street, a sidewalk, and respective locations of the plurality of robots; based on a determination that the autonomous vehicle is at the stopping position, deploying, by the autonomous vehicle, the ramp configured to enable the plurality of robots to enter the autonomous vehicle; sending, by the autonomous vehicle to the plurality of robots, a message instructing the plurality of robots to enter a cabin of the autonomous vehicle via the ramp and guiding each robot of the plurality of robots to a respective location within the cabin, wherein the message comprises an indication of an order in which the plurality of robots should enter the cabin; and based on a determination that the autonomous vehicle has reached a destination of one or more robots of the plurality of robots, deploying the ramp and guiding the one or more robots to exit the cabin via the ramp.

Aspect 2. The method of Aspect 1, further comprising generating, based on data from the one or more sensors of the autonomous vehicle, an instruction directing a movement of the plurality of robots.

Aspect 3. The method of Aspect 1 or 2, further comprising: obtaining sensor data associated with one or more of the plurality of robots; and providing, based on the sensor data, a calibration signal to one or more of the plurality of robots.

Aspect 4. The method of any of Aspects 1 to 3, wherein determining the location comprises obtaining sensor measurements from at least one of a LIDAR, a RADAR, and a camera sensor.

Aspect 5. The method of any of Aspects 1 to 4, wherein determining the location includes performing mechanical simulations of the ramp deployment.

Aspect 6. The method of any of Aspects 1 to 5, further comprising: determining, by the autonomous vehicle, the respective location or exit path of the robots using a planning stack of the autonomous vehicle.

Aspect 7. The method of any of Aspects 1 to 6, wherein the location is determined based on at least one of image data from the one or more sensors, inertial data from the one or more sensors, position data from the one or more sensors, and data from the one or more sensors describing one or more shapes at the location.

Aspect 8. The method of any of Aspects 1 to 7, wherein the autonomous vehicle comprises a locking mechanism to secure each robot within the autonomous vehicle.

Aspect 9. The method of Aspect 8, wherein the locking mechanism comprises at least one of a charger configured to charge a respective robot and a cable configured to exchange data with the respective robot.

Aspect 10. The method of any of Aspects 1 to 9, further comprising providing one or more supplies to at least one robot from the plurality of robots while the at least one robot is secured within the autonomous vehicle.

Aspect 11. The method of any of Aspects 1 to 10, wherein the autonomous vehicle is equipped to collect used materials from one or more of the plurality of robots while the one or more of the plurality of robots are secured within the autonomous vehicle.

Aspect 12. The method of any of Aspects 1 to 11, further comprising: obtaining sensor data associated with one or more of the plurality of robots; and determining, based on the sensor data, a health status of the one or more of the plurality of robots.

Aspect 13. A system comprising: one or more processors; and at least one computer-readable storage medium having stored therein instructions which, when executed by the one or more processors, cause the one or more processors to: determine, based on data from one or more sensors of an autonomous vehicle, a location for deploying a ramp configured to enable a plurality of robots to enter the autonomous vehicle, wherein the location is within a proximity to the plurality of robots, and wherein the location comprises an area that is free of obstacles having one or more dimensions above a threshold, the one or more dimensions comprising at least one of a depth, a width, and a height; generate an instruction configured to trigger the autonomous vehicle to stop at the location, the instruction indicating a stopping position within the location for the autonomous vehicle, the stopping position being relative to at least one of a street, a sidewalk, and respective locations of the plurality of robots; based on a determination that the autonomous vehicle is at the stopping position, deploy, by the autonomous vehicle, the ramp configured to enable the plurality of robots to enter the autonomous vehicle; send, by the autonomous vehicle to the plurality of robots, a message instructing the plurality of robots to enter a cabin of the autonomous vehicle via the ramp and guiding each robot of the plurality of robots to a respective location within the cabin, wherein the message comprises an indication of an order in which the plurality of robots should enter the cabin; and based on a determination that the autonomous vehicle has reached a destination of one or more robots of the plurality of robots, deploy the ramp and guiding the one or more robots to exit the cabin via the ramp.

Aspect 14. The system of Aspect 13, wherein the instructions, when executed by the one or more processors, cause the one or more processors to generate, based on data from the one or more sensors of the autonomous vehicle, an instruction directing a movement of the plurality of robots.

Aspect 15. The system of Aspect 13 or 14, wherein the instructions, when executed by the one or more processors, cause the one or more processors to: obtain sensor data associated with one or more of the plurality of robots; and provide, based on the sensor data, a calibration signal to one or more of the plurality of robots.

Aspect 16. The system of any of Aspects 13 to 15, wherein the location is determined based on sensor measurements from at least one of a LIDAR, a RADAR, and a camera sensor.

Aspect 17. The system of any of Aspects 13 to 16, wherein determining the location includes performing mechanical simulations of the ramp deployment.

Aspect 18. The system of any of Aspects 13 to 17, wherein the instructions, when executed by the one or more processors, cause the one or more processors to: determine, by the autonomous vehicle, the respective location or exit path of the robots using a planning stack of the autonomous vehicle.

Aspect 19. The system of any of Aspects 13 to 18, wherein the location is determined based on at least one of image data from the one or more sensors, inertial data from the one or more sensors, position data from the one or more sensors, and data from the one or more sensors describing one or more shapes at the location, wherein the autonomous vehicle comprises a locking mechanism to secure each robot within the autonomous vehicle, and wherein the locking mechanism comprises at least one of a charger configured to charge a respective robot and a cable configured to exchange data with the respective robot.

Aspect 20. The system of any of Aspects 13 to 19, wherein the instructions, when executed by the one or more processors, cause the one or more processors to provide one or more supplies to at least one robot from the plurality of robots while the at least one robot is secured within the autonomous vehicle.

Aspect 21. The system of any of Aspects 13 to 20, wherein the autonomous vehicle is equipped to collect used materials from one or more of the plurality of robots while the one or more of the plurality of robots are secured within the autonomous vehicle.

Aspect 22. The system of any of Aspects 13 to 21, wherein the instructions, when executed by the one or more processors, cause the one or more processors to: obtain sensor data associated with one or more of the plurality of robots; and determine, based on the sensor data, a health status of the one or more of the plurality of robots.

Aspect 23. A non-transitory computer-readable medium having stored thereon instructions which, when executed by one or more processors, cause the one or more processors to perform a method according to any of Aspects 1 to 12.

Aspect 24. A system comprising means for performing a method according to any of Aspects 1 to 12.

What is claimed is:

1. A method comprising:
   determining, based on data from one or more sensors of an autonomous vehicle, a location for deploying a ramp configured to enable a plurality of robots to enter the autonomous vehicle, wherein the location is within a proximity to the plurality of robots, and wherein the location comprises an area that is free of obstacles having one or more dimensions above a threshold, the one or more dimensions comprising at least one of a depth, a width, and a height;
   generating an instruction configured to trigger the autonomous vehicle to stop at the location, the instruction indicating a stopping position within the location for the autonomous vehicle, the stopping position being relative to at least one of a street, a sidewalk, and respective locations of the plurality of robots;
   based on a determination that the autonomous vehicle is at the stopping position, deploying, by the autonomous vehicle, the ramp configured to enable the plurality of robots to enter the autonomous vehicle;
   sending, by the autonomous vehicle to the plurality of robots, a message instructing the plurality of robots to enter a cabin of the autonomous vehicle via the ramp and guiding each robot of the plurality of robots to a respective location within the cabin, wherein the message comprises an indication of an order in which the plurality of robots should enter the cabin;
   based on a determination that the autonomous vehicle has reached a destination of one or more robots of the plurality of robots, deploying the ramp and guiding the one or more robots to exit the cabin via the ramp;
   obtaining sensor data associated with one or more of the plurality of robots; and
   determining, based on the sensor data, a health status of the one or more of the plurality of robots.

2. The method of claim 1, further comprising generating, based on data from the one or more sensors of the autonomous vehicle, an instruction directing a movement of the plurality of robots.

3. The method of claim 1, further comprising:
   obtaining sensor data associated with one or more of the plurality of robots; and
   providing, based on the sensor data, a calibration signal to one or more of the plurality of robots.

4. The method of claim 1, wherein determining the location comprises obtaining sensor measurements from at least one of a light detection and ranging (LIDAR) sensor of the autonomous vehicle, a radio detection and ranging (RADAR) sensor of the autonomous vehicle, and a camera sensor of the autonomous vehicle.

5. The method of claim 1, wherein determining the location includes performing mechanical simulations of the ramp deployment.

6. The method of claim 1, further comprising: determining, by the autonomous vehicle, a respective location or exit path of the plurality of robots using a planning stack of the autonomous vehicle.

7. The method of claim 1, wherein the location is determined based on at least one of image data from the one or more sensors, inertial data from the one or more sensors, position data from the one or more sensors, and data from the one or more sensors describing one or more shapes at the location.

8. The method of claim 1, wherein the autonomous vehicle comprises a locking mechanism to secure each robot within the autonomous vehicle.

9. The method of claim 8, wherein the locking mechanism comprises at least one of a charger configured to charge a respective robot and a cable configured to exchange data with the respective robot.

10. The method of claim 1, further comprising providing one or more supplies to at least one robot from the plurality of robots while the at least one robot is secured within the autonomous vehicle.

11. The method of claim 1, wherein the autonomous vehicle is equipped to collect used materials from one or more of the plurality of robots while the one or more of the plurality of robots are secured within the autonomous vehicle.

12. A system comprising:
   one or more processors; and
   at least one computer-readable storage medium having stored therein instructions which, when executed by the one or more processors, cause the one or more processors to:
   determine, based on data from one or more sensors of an autonomous vehicle, a location for deploying a ramp configured to enable a plurality of robots to enter the autonomous vehicle, wherein determining the location includes performing mechanical simulations of the ramp deployment, wherein the location is within a proximity to the plurality of robots, and wherein the location comprises an area that is free of obstacles having one or more dimensions above a threshold, the one or more dimensions comprising at least one of a depth, a width, and a height;

generate an instruction configured to trigger the autonomous vehicle to stop at the location, the instruction indicating a stopping position within the location for the autonomous vehicle, the stopping position being relative to at least one of a street, a sidewalk, and respective locations of the plurality of robots;

based on a determination that the autonomous vehicle is at the stopping position, deploy, by the autonomous vehicle, the ramp configured to enable the plurality of robots to enter the autonomous vehicle;

send, by the autonomous vehicle to the plurality of robots, a message instructing the plurality of robots to enter a cabin of the autonomous vehicle via the ramp and guiding each robot of the plurality of robots to a respective location within the cabin, wherein the message comprises an indication of an order in which the plurality of robots should enter the cabin; and based on a determination that the autonomous vehicle has reached a destination of one or more robots of the plurality of robots, deploy the ramp and guiding the one or more robots to exit the cabin via the ramp.

13. The system of claim 12, wherein the instructions, when executed by the one or more processors, cause the one or more processors to generate, based on data from the one or more sensors of the autonomous vehicle, an instruction directing a movement of the plurality of robots.

14. The system of claim 12, wherein the instructions, when executed by the one or more processors, cause the one or more processors to:

obtain sensor data associated with one or more of the plurality of robots; and provide, based on the sensor data, a calibration signal to one or more of the plurality of robots.

15. The system of claim 12, wherein the location is determined based on sensor measurements from at least one of a light detection and ranging (LIDAR) sensor of the autonomous vehicle, a radio detection and ranging (RADAR) sensor of the autonomous vehicle, and a camera sensor of the autonomous vehicle.

16. The system of claim 12, wherein the instructions, when executed by the one or more processors, cause the one or more processors to: determine, by the autonomous vehicle, a respective location or exit path of the robots using a planning stack of the autonomous vehicle.

17. The system of claim 12, wherein the location is determined based on at least one of image data from the one or more sensors, inertial data from the one or more sensors, position data from the one or more sensors, and data from the one or more sensors describing one or more shapes at the location, wherein the autonomous vehicle comprises a locking mechanism to secure each robot within the autonomous vehicle, and wherein the locking mechanism comprises at least one of a charger configured to charge a respective robot and a cable configured to exchange data with the respective robot.

18. The system of claim 12, wherein the instructions, when executed by the one or more processors, cause the one or more processors to provide one or more supplies to at least one robot from the plurality of robots while the at least one robot is secured within the autonomous vehicle.

19. A method comprising:

determining, based on data from one or more sensors of an autonomous vehicle, a location for deploying a ramp configured to enable a plurality of robots to enter the autonomous vehicle, wherein determining the location includes performing mechanical simulations of the ramp deployment, wherein the location is within a proximity to the plurality of robots, and wherein the location comprises an area that is free of obstacles having one or more dimensions above a threshold, the one or more dimensions comprising at least one of a depth, a width, and a height;

generating an instruction configured to trigger the autonomous vehicle to stop at the location, the instruction indicating a stopping position within the location for the autonomous vehicle, the stopping position being relative to at least one of a street, a sidewalk, and respective locations of the plurality of robots;

based on a determination that the autonomous vehicle is at the stopping position, deploying, by the autonomous vehicle, the ramp configured to enable the plurality of robots to enter the autonomous vehicle;

sending, by the autonomous vehicle to the plurality of robots, a message instructing the plurality of robots to enter a cabin of the autonomous vehicle via the ramp and guiding each robot of the plurality of robots to a respective location within the cabin, wherein the message comprises an indication of an order in which the plurality of robots should enter the cabin; and based on a determination that the autonomous vehicle has reached a destination of one or more robots of the plurality of robots, deploying the ramp and guiding the one or more robots to exit the cabin via the ramp.

* * * * *